Aug. 13, 1963

L. M. HALLS ETAL 3,100,367

HAY CONDITIONER

Filed Aug. 30, 1960

INVENTOR
LAWRENCE M. HALLS
LEONARD M. BUMM

Walter V. Wright AGENT

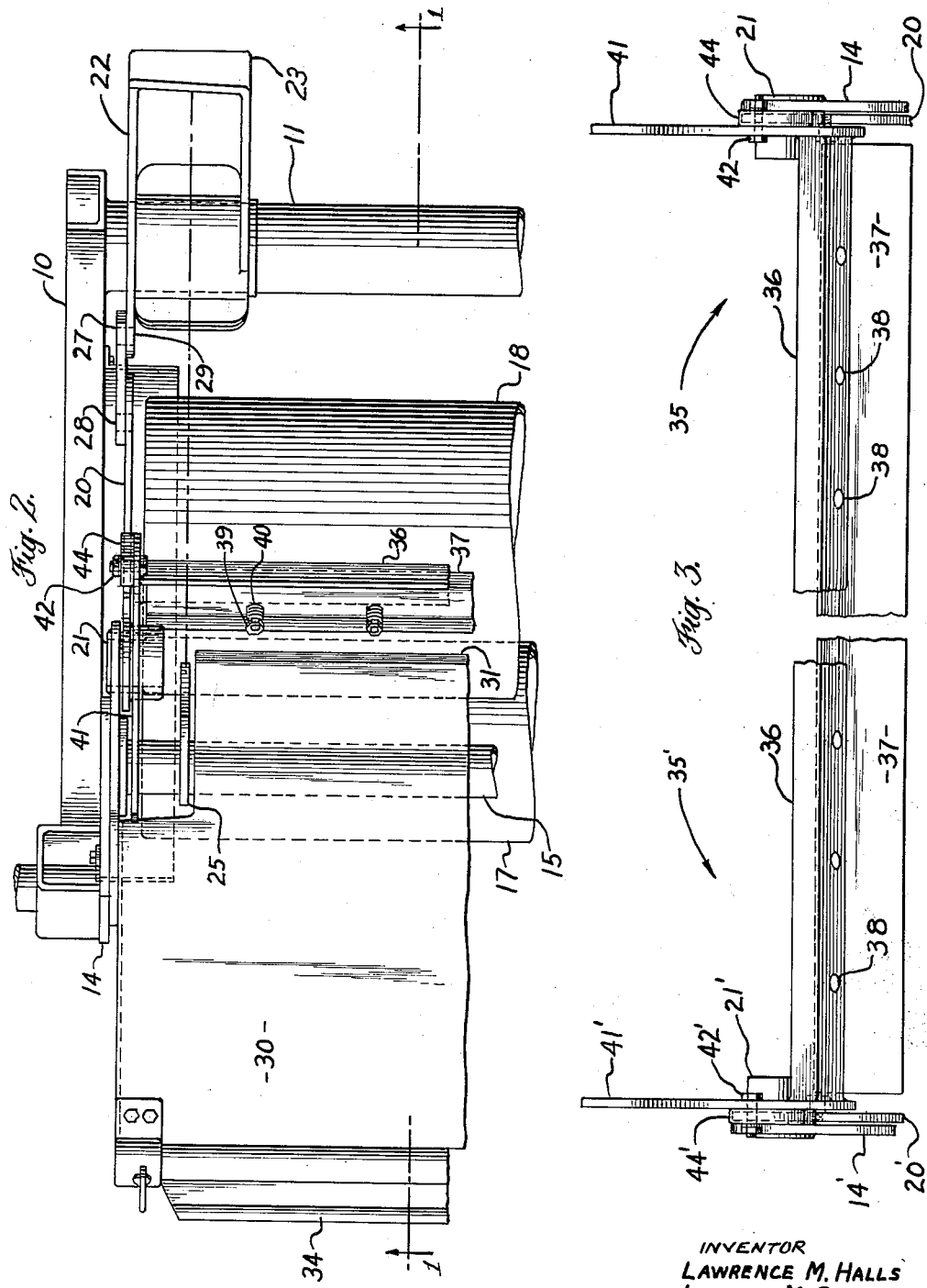

INVENTOR
LAWRENCE M. HALLS
LEONARD M. BUMM

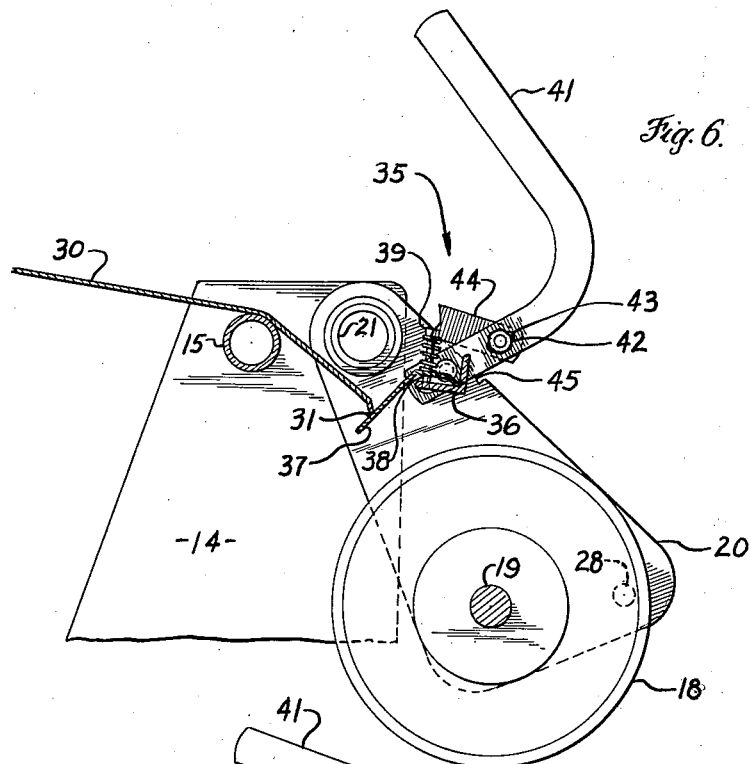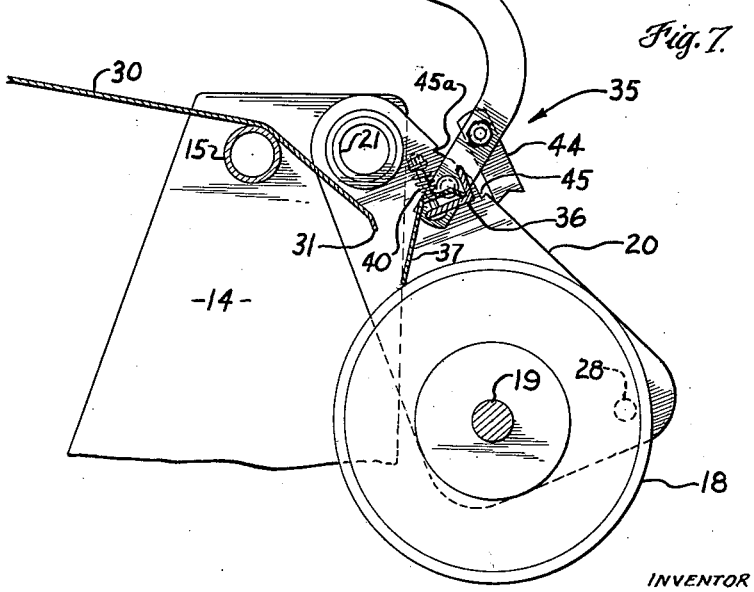
INVENTOR
LAWRENCE M. HALLS
LEONARD M. BUMM

United States Patent Office 3,100,367
Patented Aug. 13, 1963

3,100,367
HAY CONDITIONER
Lawrence M. Halls, New Holland, and Leonard M. Bumm, Blue Ball, Pa., assignors to Sperry Rand Corporation, New Holland, Pa., a corporation of Delaware
Filed Aug. 30, 1960, Ser. No. 52,969
5 Claims. (Cl. 56—1)

This invention relates to roll scraping mechanism which though capable of other uses is especially adapted for use in a hay conditioning machine.

One type of hay conditioning machine employs cooperating opposed crusher rolls between which mowed hay passes as the machine is drawn over a field. The rolls crack the stems to accelerate drying of the hay. Upon exiting from between the rolls, the material is thrown upwardly and rearwardly therefrom. It is customary to provide a deflecting shield on the rear part of the machine to intersect the stream of crushed material and deflect it back on to the ground.

A common problem in machines of the above type arises from the fact that plant exudate and other foreign matter has a tendency to cling to the moving surface of the crusher rolls. If this material is allowed to build up on the roll surface, the result is uneven contact between the rolls and, thus, improper crushing of the material. In the past, scraper blades have been employed to prevent this build up of material, but material accumulating on the conventional blades soon leads to uneven scraping which is followed by a build up of material on the rolls. Moreover, the length and position of the blades on the machine generally renders them difficult to clean.

Another problem with machines of the above type is that quantities of the light, highly nutritious, leaves cling momentarily to the upper crusher roll and are thrown up on top of the deflecting shield. In time, large quantities of leaves accumulate on top of the shield whereupon they must be manually removed or they will be blown, or bounced, off and lost during transport of the machine.

For certain crops and crop conditions, material does not cling to the rolls and it is unnecessary to clean them. In this case the existing practice is to either employ the scraper whether it is needed or not, in which case unnecessary wear of the scraper blade occurs; or, to completely remove the scraper mechanism from the machine when it is not needed. This is a time consuming operation accompanied by the problems of keeping track of the removed parts.

It is a primary object of this invention to provide an improved roll cleaning device for a hay crusher.

It is another object of this invention to provide a roll scraper that may be latched in scraping or nonscraping position and need not be removed when not in use.

It is another object of this invention to provide a scraper that functions to prevent loss of material over the deflecting shield whether in scraping or nonscraping position.

Another object of this invention is to provide roll scraping means whereby the scraper may be easily freed of material tending to build up on the blade.

Another object of this invention is to provide a roll scraper wherein the blade pressure on the roll may be adjusted.

It is another object of this invention to provide a roll scraper wherein adjustment may be made to compensate for tolerance and wear and wherein adjustment for normal blade wear occurs automatically.

It is a further object of this invention to provide a simple latch mechanism for a roll scraper wherein the blade may be locked in scraping or nonscraping position.

Still another object of this invention is to provide a rugged, economical roll scraping mechanism having long service life and requiring little or no maintenance.

Other objects of this invention will be apparent hereinafter from the specification and from the recital in the appended claims.

In the drawings:

FIG. 2 is a fragmentary plan view of the device of FIG. 1;

FIG. 3 is a view taken on the line 3—3 of FIG. 1; and,

FIG. 6 is a fragmentary view similar to FIG. 5 showing the scraper mechanism locked in non-scraping position; and FIG. 7 is a fragmentary view similar to FIG. 6 showing the scraper locking means in position to lock the blade in scraping engagement with the roll upon depression of the handle to the position shown in FIG. 1.

Since the scraper mechanism of this invention, as well as the hay conditioner to which the scraper is applied, is symmetrical with respect to the longitudinal axis of the hay conditioner; generally, only one side of the machine will be described. It is to be understood that with the exception of the members which extend transversely across the machine, all parts are duplicated on both sides of the machine as indicated in FIG. 3 by the "primed" numerals.

Figure 1:
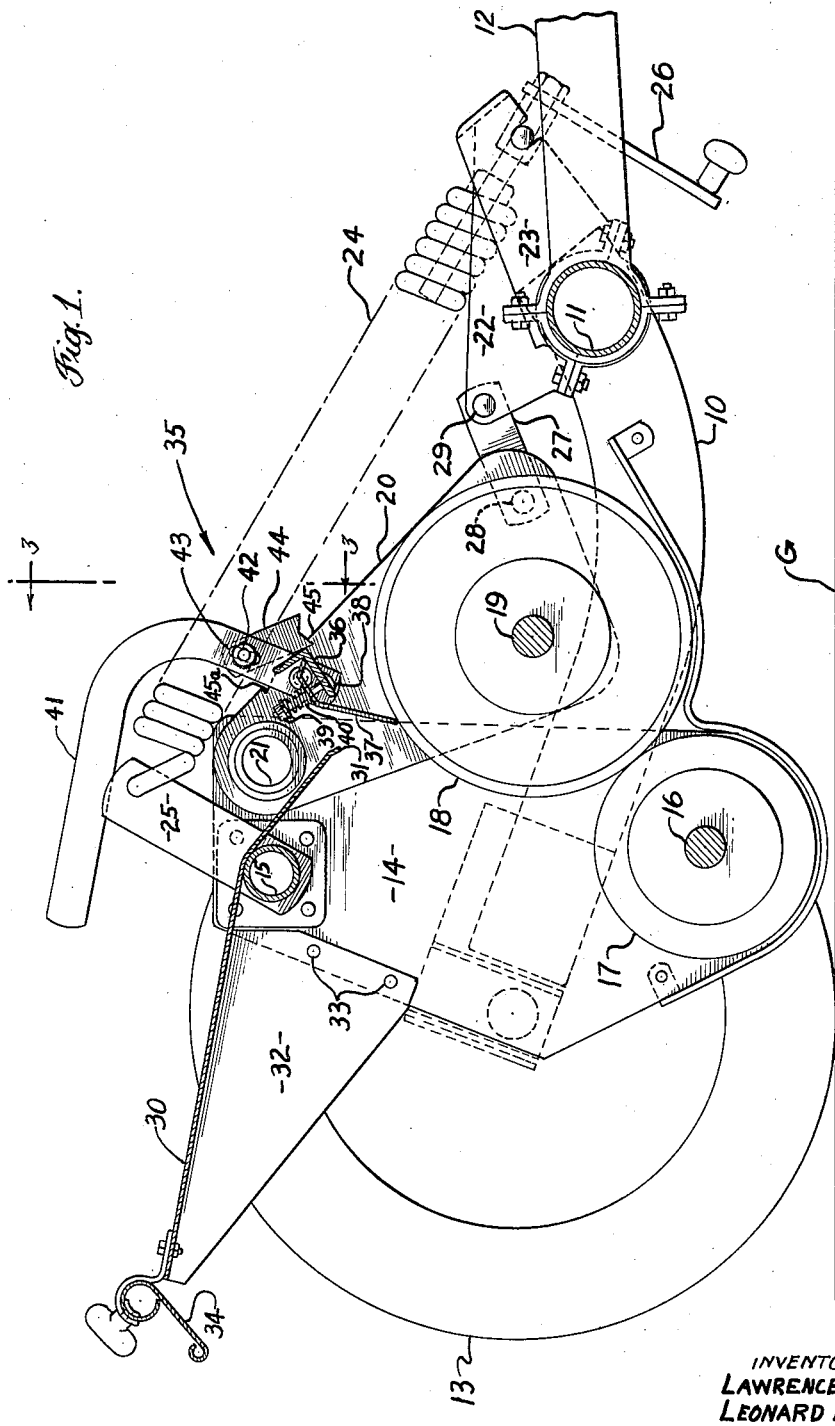
FIG. 1 is a sectional elevational view taken on the line 1—1 of FIG. 2 and showing a hay conditioner employing roll scraper mechanism constructed in accordance with this invention.
Figure 4:
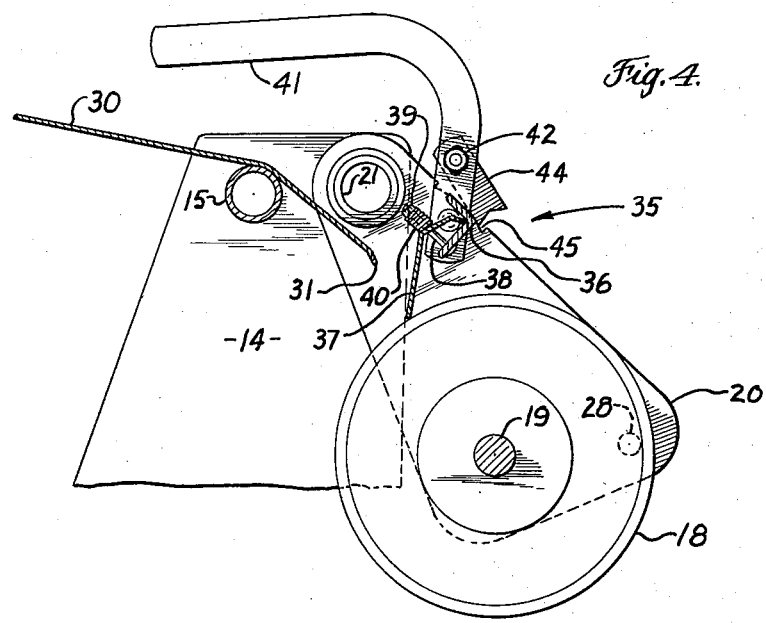
FIG. 4 is a fragmentary view similar to FIG. 1 showing the scraper mechanism in the process of being locked into, or unlocked from, scraping engagement with the hay conditioning roll.
Figure 5:
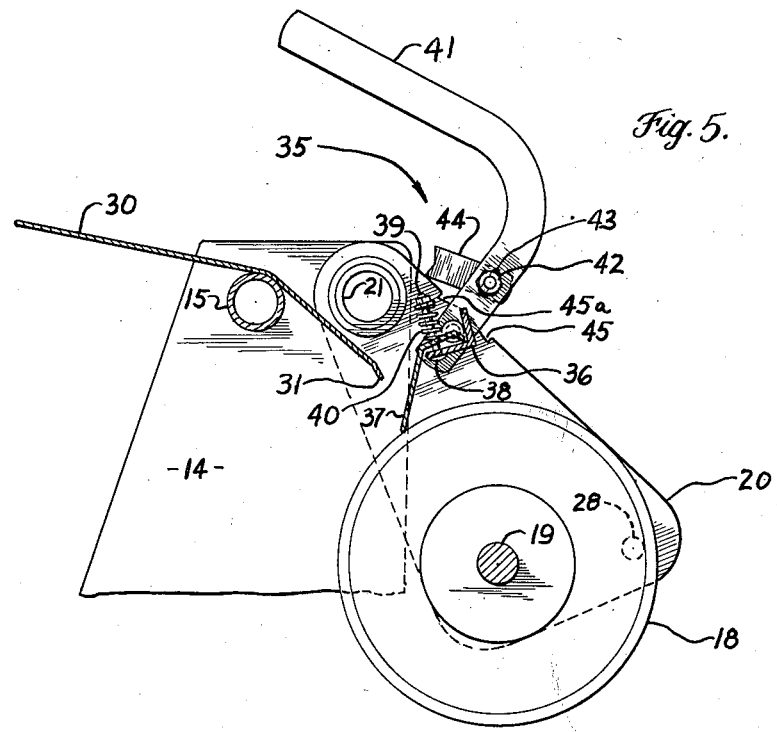
FIG. 5 is a fragmentary view similar to FIG. 4 showing the scraper blade in engagement with the roll but the scraper locking means in position to lock the blade in non-scraping position upon movement of the blade to its non-scraping position.

As seen in FIG. 1, the crusher comprises a pair of parallel longitudinal frame members 10 (one of which is shown). The forward ends of members 10 are interconnected by a tubular cross member 11 which carries the rear end of draw bar 12. The rear end of each member 10 is supported by a ground wheel 13. A vertical plate 14 is welded, or otherwise connected, to each frame member 10. The plates 14 are interconnected at the top by a tubular cross member 15. A stub shaft 16 journalled at the lower end of each plate 14 carries lower (or fixed) crop pick-up and crusher roll 17. Upper (or movable) crusher roll 18 is carried by stub shafts 19 journalled in roll supporting members, or plates, 20. The roll supports 20 are pivotally mounted at 21 on vertical plates 14. Consequently, roll 18 may move radially away from lower roll 17 as is customary in the crusher art.

Pivotally mounted on tubular cross member 11 is a bell crank plate 22, one arm of which carries a bracket 23 (see FIG. 2) for one end of tension spring 24. The other end of spring 24 is connected to a bracket 25 fixedly mounted on vertical plate 14. The tension of spring 24 may be adjusted by crank 26 in a manner, per se, well known. The force of spring 24 biases bell crank plate 22 in a counterclockwise direction about cross member 11 as viewed in FIG. 1.

A toggle link 27 has one end pivotally connected at 28 to roll support 20 and the other end pivotally connected at 29 to the other arm of bell crank plate 22. From the above, it will be seen that spring 24 acts through bell crank 22, toggle link 27 and roll support 20 to supplement gravity in biasing upper crusher roll 18 into engagement with lower roll 17.

It is preferred that lower roll 17 be rubber or rubber coated while upper roll 18 is made of steel. This combination of rolls provides proper crushing action as well as enabling the lower roll to pick up the material from ground G and feed it between the rolls. Adherence of material to the rubber roll is no problem; since the surface of this roll is continually flexing during the crushing operation.

As the material passes between the rolls it is directed upwardly and rearwardly therefrom whereupon it contacts the under side of a deflecting shield 30. Shield 30 extends substantially horizontally across the back of the machine and has a forward edge 31 which is parallel to, and spaced from, roll 18. The side portions 32 of shield 30 are turned down and mounted to plates 14, as at 33 (FIG. 1). The rear portion 34 of shield 30 is adjustable and serves to direct the crushed material back down into the ground in a stream whereby it lands on end and falls in a loose row which facilitates drying.

The roll scraping mechanism of this invention is indicated generally by the numeral 35. Extending transversely between roll supports 20 is a bar, or blade supporting member, 36. Bar 36 is L-shaped in cross section, as may be seen in FIG. 1, and has its ends pivotally mounted on roll supports 20. A scraper blade 37, of generally curved cross section, has one edge abutted into the apex of bar 36 and is attached thereto by bolts 38 which carry nuts 39. A spring 40 surrounds each bolt 38 and resiliently urges blade 37 into engagement with bar 36. A handle 41 is integrally mounted on bar 36. A nut and bolt 42, or other conventional means, extends through a slot 43 in handle 41 to adjustably carry a swingable latch bar 44. Latch member 44 is engageable, selectively, with notches 45 and 45a formed in roll support 20 to lock the scraper blade in scraping or nonscraping position as shown, respectively, in FIGS. 1 to 6.

The operation of the hay conditioner is as follows: power means (not shown) connected to the P.T.O. of the towing vehicle serves to drive roll 17 counterclockwise and roll 18 clockwise as viewed in FIG. 1. Roll 17 lifts the material from the ground G and feeds it between the rolls. The material is crushed between the rolls and ejected upwardly and rearwardly in a stream against the under side of shield 30. Shield 30 with its adjustable portion 34 deflects this stream of material back down to the ground.

FIG. 1 of the drawings shows the roll scraper, or cleaner, latched in a first, or scraping, position. When material clinging to the surface of roll 18 is contacted by scraper blade 37, this material rebounds away from the blade and the roll. The speed of the rolls and the position of the blade are such that the rebounding material passes rearwardly of forward edge 31 of shield 30 and is, therefore, prevented from accumulating on top of the shield.

It may be seen in FIG. 1 that spring 40, which is precompressed by nut 39 on bolt 38, will expand to automatically compensate for wear of blade 37 resulting from its frictional engagement with roll 18. The nuts 39 may also be employed to vary the pressure of the scraping blade on roll 18, although slot 43 and latch member bolt 42 are preferably employed to accomplish this. It will be apparent that relocation of bolt 42 to a lower position in slot 43 will increase the bearing pressure of blade 37 on roll 18, while relocation of the bolt to a higher position will decrease this pressure.

FIG. 6 shows the scraper latched in a second, or nonscraping position. In this position of the blade, it engages edge 31 of shield 30. Again no material can pass to the upper side of shield 30. The steps employed to move scraper 37 from the position of FIG. 1 to the position of FIG. 6 are as follows: a downward pressure applied near the end of handle 41 moves latch member 44 from its FIG. 1 position to its FIG. 4 position. The latch is then "flipped" over, about bolt 42, to its FIG. 5 position. An upward pressure near the end of handle 41 will cause latch 44 to slide over the edge of roll support 20 and drop into notch 45a.

To free blade 37 of material tending to build up thereon, the parts are moved to the position shown in FIG. 7. From this position, a quick upward pull near the end of handle 41 will "slap" blade 37 against edge 31 of shield 30, thus jarring the accumulated material from the blade.

While this invention has been described in connection with a particular embodiment thereof, it will be understood that it is capable of further modification and this application is intended to cover any variations, uses, or adaptations of the invention, following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay conditioner comprising a mobile frame adapted to be towed over the ground in a forward direction, a pair of laterally spaced roll supports mounted on said frame, a transversely disposed crop treating roll journalled in said roll supports and extending therebetween, a crop deflecting shield mounted on said frame rearwardly of said roll and having a forward edge spaced from and extending parallel to said roll, a blade supporting member extending transversely between said roll supports and having its ends journalled thereon, a scraping blade disposed in the space between said roll and the forward edge of said shield and extending parallel to said roll and the forward edge of said shield, means resiliently mounting said blade on said blade supporting member, a handle on said blade supporting member whereby said member may be pivoted from a first position wherein said blade is in scraping engagement with said roll to a second position wherein said blade is clear of said roll and in engagement with the forward edge of said shield, and latch means carried by said handle and engageable with one of said roll supports to lock said member selectively in said first or second position.

2. A hay conditioner as recited in claim 1 wherein the means resiliently mounting said blade on said blade supporting member comprises, a plurality of bolts extending through said member and said blade, a spring carried on each bolt and urging said blade against said member, and a nut received on each bolt whereby the force exerted on said blade by said springs may be adjusted.

3. A hay conditioner as recited in claim 1 wherein said one of said roll supports is provided with a plurality of notches and said latch means comprises a latch member pivotally mounted on said handle and engageable with one of said notches to lock said blade supporting member in said first position and engageable with another of said plurality of notches to lock said blade supporting member in said second position.

4. A hay conditioner as recited in claim 3 wherein said handle defines an elongate slot, a bolt extends through said slot, and said latch member is mounted on said bolt and pivotal thereabout whereby the locking force exerted on said handle by said latch member may be regulated by varying the position of said bolt in said slot.

5. A hay conditioner comprising a mobile frame adapted to be towed over the ground in a forward direction, said frame having a pair of laterally spaced roll supports, a transversely disposed crop treating roll journalled in said roll supports and extending therebetween, a crop deflecting shield mounted on said frame rearwardly of said roll and having a forward edge spaced from and extending parallel to said roll, a scraper blade extending transversely between said roll supports and disposed in the space between said roll and the forward edge of said crop deflecting shield, means pivotally mounting said blade on said frame, said blade being movable between a first position in scraping engagement with said roll and a second position clear of said roll and in engagement with the forward edge of said shield, means connected to said blade to move the blade selectively to said first or second position, a crop pick-up roll mounted on said frame and disposed in cooperative relation to said treating roll, and releasable locking means operatively associated with said blade to releasably lock the blade selectively in said first or second position.

References Cited in the file of this patent
UNITED STATES PATENTS

| | | |
|---|---|---|
| 107,074 | Conaughy | Sept. 6, 1870 |
| 475,291 | Burr et al. | May 24, 1892 |
| 2,592,269 | Getz | Apr. 8, 1952 |